United States Patent [19]

Akimoto et al.

[11] Patent Number: 4,942,474
[45] Date of Patent: Jul. 17, 1990

[54] SOLID-STATE IMAGING DEVICE HAVING PHOTO-ELECTRIC CONVERSION ELEMENTS AND OTHER CIRCUIT ELEMENTS ARRANGED TO PROVIDE IMPROVED PHOTO-SENSITIVITY

[75] Inventors: Hajime Akimoto, Hachioji; Shinya Ohba, Kanagawa; Toshifumi Ozaki, Koganei, all of Japan

[73] Assignee: Hitachi, Ltd., Tokyo, Japan

[21] Appl. No.: 281,220

[22] Filed: Dec. 8, 1988

[30] Foreign Application Priority Data

Dec. 11, 1987 [JP] Japan ................................. 62-311910
Mar. 25, 1988 [JP] Japan ................................. 63-69371

[51] Int. Cl.$^5$ ............................................. H04N 3/14
[52] U.S. Cl. ............................. 358/213.11; 358/213.27
[58] Field of Search ..................... 358/213.26, 213.27, 358/213.11, 213.12, 212, 213.18, 213.31, 213.28

[56] References Cited

U.S. PATENT DOCUMENTS

| | | | |
|---|---|---|---|
| 4,363,963 | 12/1982 | Ando | 358/212 |
| 4,712,138 | 12/1987 | Kyuma et al. | 358/213.31 |
| 4,728,802 | 3/1988 | Baron | 358/213.11 |
| 4,809,075 | 2/1989 | Akimoto et al. | 358/213.18 |
| 4,810,896 | 3/1989 | Tanaka et al. | 358/213.18 |
| 4,819,071 | 4/1989 | Nakamura | 358/213.12 |

Primary Examiner—Stephen Brinich
Attorney, Agent, or Firm—Antonelli, Terry, Stout & Kraus

[57] ABSTRACT

A solid-state imaging device including a plurality of photoelectric conversion elements (for example, photodiodes) arranged on a semiconductor substrate so as to form a matrix and read-out means for reading out signal charges which are stored in the photodiodes in accordance with incident light, in a predetermined order, is disclosed in which device the read-out means is made up of a plurality of active elements such as a MOS transistor connected to a photodiode, part of the active elements are used as a pixel amplifier for amplifying the signal charge of the photodiode in such a manner that the signal charge is converted into a current or voltage, the output of the pixel amplifier at a time the signal charge of the photodiode is not applied to the input part of the pixel amplifier and the output of the pixel amplifier at a time the signal charge of the photodiode is applied to the input part of the pixel amplifier are separately stored in a pair of storage means, and the outputs of a plurality of pairs of storage means are successively taken out in accordance with a scanning signal.

30 Claims, 11 Drawing Sheets

SOLID-STATE IMAGING DEVICE HAVING PHOTO-ELECTRIC CONVERSION ELEMENTS AND OTHER CIRCUIT ELEMENTS ARRANGED TO PROVIDE IMPROVED PHOTO-SENSITIVITY

BACKGROUND OF THE INVENTION

The present invention relates to a solid-state imaging device, and more particularly to a solid-state imaging device, in which photoelectric conversion elements and other circuit elements are integrated on a semiconductor substrate.

A solid-state imaging device is required to have the same resolution as an image pickup tube used for the present television broadcasting. Hence, in the solid-state imaging device, a multiplity of photoelectric conversion elements (each for forming a pixel) are arranged so as to form a matrix having 500 rows and 500 to 1,000 columns, and scanning elements corresponding to the photoelectric conversion elements are disposed together with the photoelectric conversion elements. Accordingly, the solid-state imaging device is fabricated by using the MOSIC technology capable of integrating circuit elements at a high-density, and usually includes CCD's (namely, charge coupled devices) or MOS transistors in addition to the photoelectric conversion elements.

The above prior art will be expained below, with reference to the drawings.

FIG. 1 shows the circuit configuration of a conventional CCD-type solid-state imaging device. It is to be noted that only 2×2 pixels are shown in FIG. 1 for the sake of simplicity. In FIG. 1, reference numerals 611, 621, 631 and 641 designate photoelectric conversion elements (for example, photodiodes) for converting incident light into an electric charge, 66, 67 and 68 CCD's for transferring a signal charge, 901 and 902 driver transistors of source follower circuits, 903 and 904 load transistors of the source follower circuits, 501, 502 and 503 current buffer circuits, 504, 505 and 506 resistors, 507 and 508 capacitors, 509 and 510 switches, and 511 a power source. The circuit elements 501 to 511 make up a correlated double sampling circuit 500. Referring to FIG. 1, when light is incident on the photodiodes 611, 621, 631 and 641, a signal charge corresponding to an incident light quantity is stored in each photodiode. The electric charges stored in the photodiodes are successively transferred to the driver transistor 901 of source follower circuit through the CCD's 66, 67 and 68, and the output of the driver transistor 902 of another source follower circuit is applied to the correlated double sampling circuit 500. Then, the correlated double sampling circuit 500 delivers the difference between that output of the driver transistor 902 which is obtained before the signal charge contributes to the output of the transistor 902, and that output of the transistor 902 which is obtained after the signal charge has contributed to the output of the transistor 902. In more detail, the switches 509 and 510 are first turned on and turned off, respectively, to supply the capacitor 507 with that output of the transistor 902 which is obtained before the signal charge contributes to the output of the transistor 902. Next, the switches 509 and 510 are turned off and turned on, respectively, to lead that output of the transistor 902 which is obtained after the signal charge has contributed to the output of the transistor 902, to the capacitor 508. Thus, the capacitor 508 stores the difference between that output of the transistor 902 which is obtained before the signal charge contributes to the output of the transistor 902, and that output of the transistor 902 which is obtained after the signal charge has contributed to the output of the transistor 902. A sampling circuit of this kind is described in an article entitled "Characterization of Surface Channel CCD Image Array at Low Light Levels" by M. H. White et al. (IEEE JOURNAL OF SOLID-STATE CIRCUITS, Vol. SC-9, No. 1, FEBRUARY, 1974, pages 1 through 13).

Next, a conventional MOS-type solid-state imaging device will be explained, with reference to FIG. 2. It is to be noted that only a single pixel is shown in FIG. 2 for the sake of simplicity. In FIG. 2, reference numeral 611 designates a photodiode equivalent to that shown in FIG. 1, 601 a transistor for amplifying a signal, 604 a switch, 605 a load resistor, 606 a power source, and 64 a signal line. Further, another switch 602 and another power source 603 make up a reset circuit. Referring to FIG. 2, when light is incident on the photodiode 611, a signal charge corresponding to an incident light quantity is generated in the photodiode 611. The signal charge thus obtained is converted by the amplifying transistor 601 into an electric current, which flows through the signal line 64 to reach an output terminal.

In the conventional imaging device of FIG. 1, the signal charge is transferred to an output amplifier through the CCD's 66, 67 and 68, without being converted into a current or voltage. Accordingly, a noise charge may be mixed with the signal charge when the signal charge is propagated through the CCD's 66, 67 and 68, and thus there arises a problem that a signal-to-noise ratio is decreased by the noise charge.

Specifically, in a case where part of incident light leaks through the crack of a shading film, there arises a serious problem that a noise charge due to the leakage light is introduced into the CCD's 66, 67 and 68 and thus a smear is generated.

Further, in the conventional imaging device of FIG. 2, a plurality of amplifying transistors 601 are disposed, and variations in output level of the transistor 601 (the so-called offset) due to variations in impurity concentration or surface states or energy states at the silicon-oxide interface existing under the gate of the transistor 601 are sent out, as they are. Thus, the above variations in output level are observed as a signal. Accordingly, noise which is called "fixed pattern noise" is generated.

In view of the above-mentioned problems of these prior arts, the present inventors have proposed a solid-state imaging device which can suppress the smear and is low in noise level, in a U.S. patent application Ser. No. 109,319 filed on Oct. 19, 1987.

An example of the above solid-state imaging device will be explained below, with reference to FIG. 3. FIG. 3 is a circuit diagram showing this example. Referring to FIG. 3, photoelectric conversion elements (for example, photodiodes) 1 store electric charges corresponding to incident light, and are arranged so as to form a two-dimensional matrix. A photodiode 1 is connected to a reset switch 3 and the gate of a pixel amplifier 4 through a vertical gate switch 2 which is controlled by a vertical gate line 5, and a horizontal gate switch 43 which is controlled by a horizontal gate line 51. The drain electrode of the pixel amplifier 4 is connected to a drain line 44, and the source electrode of the pixel amplifier 4 is connected to a load transistor 49 through a horizontal signal line 45, a read-out gate switch 47 and a vertical signal line 48. The circuit elements 4, 45, 47, 48 and 49 make up a source follower circuit. Now, explanation will be made of the operation of a single pixel which is selected by a horizontal scanning circuit (for example, horizontal register) 22 and a vertical scanning circuit (for example, vertical register) 21. A reset operation is first performed by the reset switch 3, and the source follower circuit including the pixel amplifier 4 is operated to deliver an output signal which is obtained in a reset period, from an output terminal 50. Next, the signal charge stored in the photodiode 1 is supplied to the pixel amplifier 4 through the vertical gate switch 2 and the horizontal gate switch 43, to deliver an output signal corresponding to the signal charge, from the output terminal 50. Thus, the read-out operation of one pixel is completed. As can be seen from the above explanation, the output signal obtained in the reset period and the output signal obtained at a time the signal charge is applied to the pixel amplifier, are time-sequentially delivered. By using the difference between these output signals, noise due to variations of offset of pixel amplifier and the 1/f noise of the pixel amplifier 4 can be readily suppressed.

In the imaging device of FIG. 3, however, each pixel includes four transistors. Hence, the area of the photodiode 1 included in each pixel is restricted, and thus it is impossible to improve the photo-sensitivity of the imaging device in a great degree.

SUMMARY OF THE INVENTION

It is an object of the present invention to provide a solid-state imaging device, in which the area occupied by a photodiode can be enlarged in each pixel, and thus the photo-sensitivity of each pixel can be improved in a great degree.

In order to attain the above object, according to the present invention, there is provided a solid-state imaging device including a plurality of photodiodes arranged so as to form a two-dimensional matrix, amplifier means arranged in proximity to each of the photodiodes for amplifying a signal charge stored in each photodiode, and reset means for resetting the input of the amplifier means, in which device the output of the amplifier means at a time the input of the amplifier means is reset and the output of the amplifier means at a time the signal charge stored in the photodiode is applied to the amplifier means, are separately stored in a pair of storage means, and the outputs of a plurality of pairs of storage means are successively scanned by scanning means.

Each of the storage means is provided with a switching element for taking out the output of each storage means, and the outputs of all the storage means are successively taken out in accordance with the operation of the scanning means, to be delivered as the output of the imaging device. In more detail, according to the present invention, the outputs of a plurality of pixel in the same row are transferred to corresponding storage means at the same time. Accordingly, each pixel is not required to include one of gate switches for scanning pixels in the same row successively. Thus, the area of a photodiode included in each pixel can be enlarged by an amount corresponding to the gate switch. That is, according to the present invention, there is provided a high-sensitivity solid-state imaging device which is simple in structure of pixel, low in noise level, and large in light receiving area.

These and other objects and many of the attendant advantages of the present invention will be readily appreciated and becomes better understood by reference to the following detailed description when considered in connection with the accompanying drawings.

DESCRIPTION OF THE PREFERRED EMBODIMENTS

Figure 1:
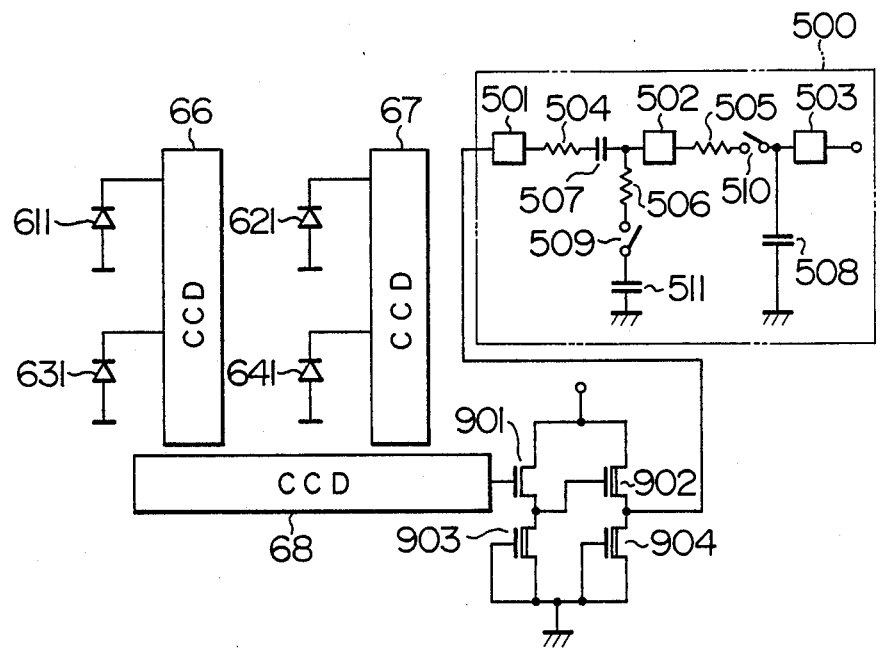
FIG. 1 is a circuit diagram showing a conventional CCD-type solid-state imaging device.
Figure 2:
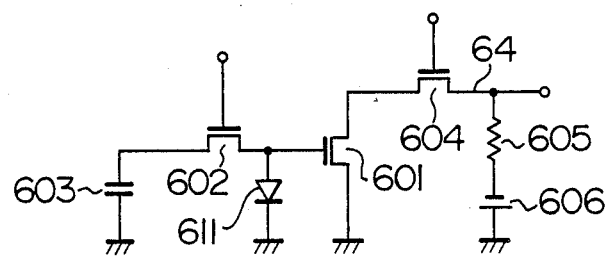
FIG. 2 is a circuit diagram showing part of a conventional MOS-type solid-state imaging device.
Figure 3:
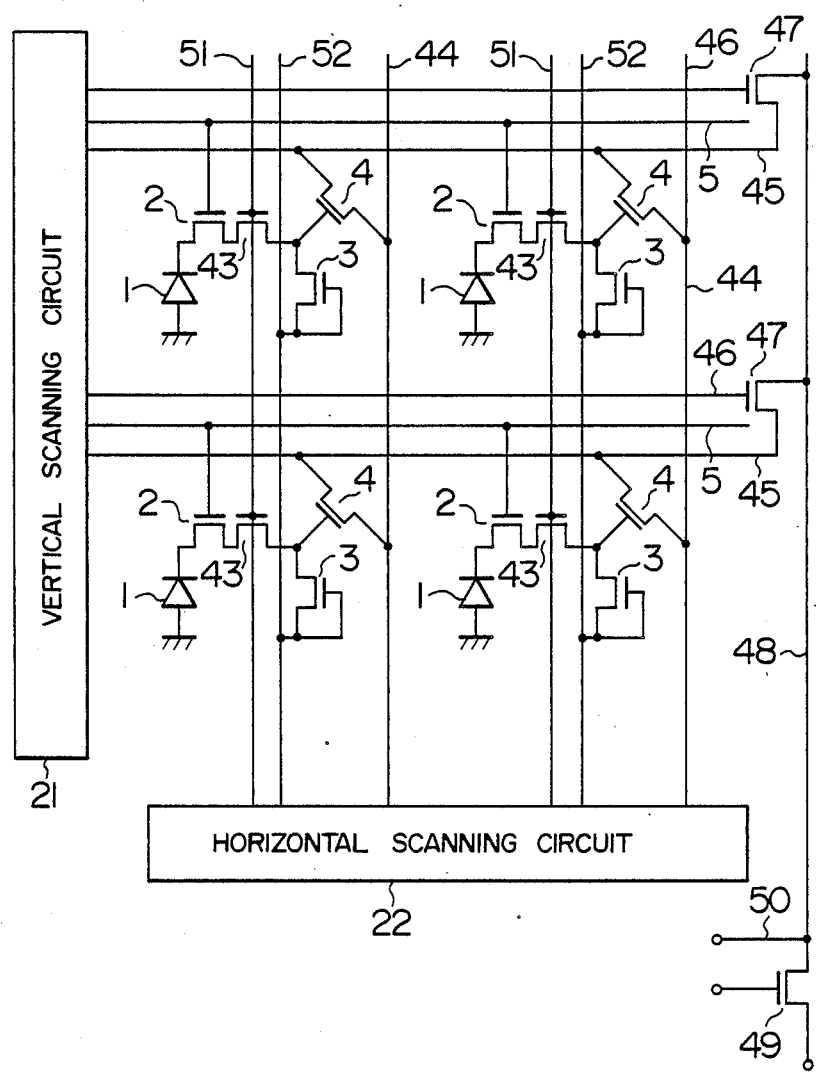
FIG. 3 is a circuit diagram showing an example of a solid-state imaging device which includes pixel amplifiers and is disclosed in the U.S. patent application Ser. No. 109,319.
Figure 4:
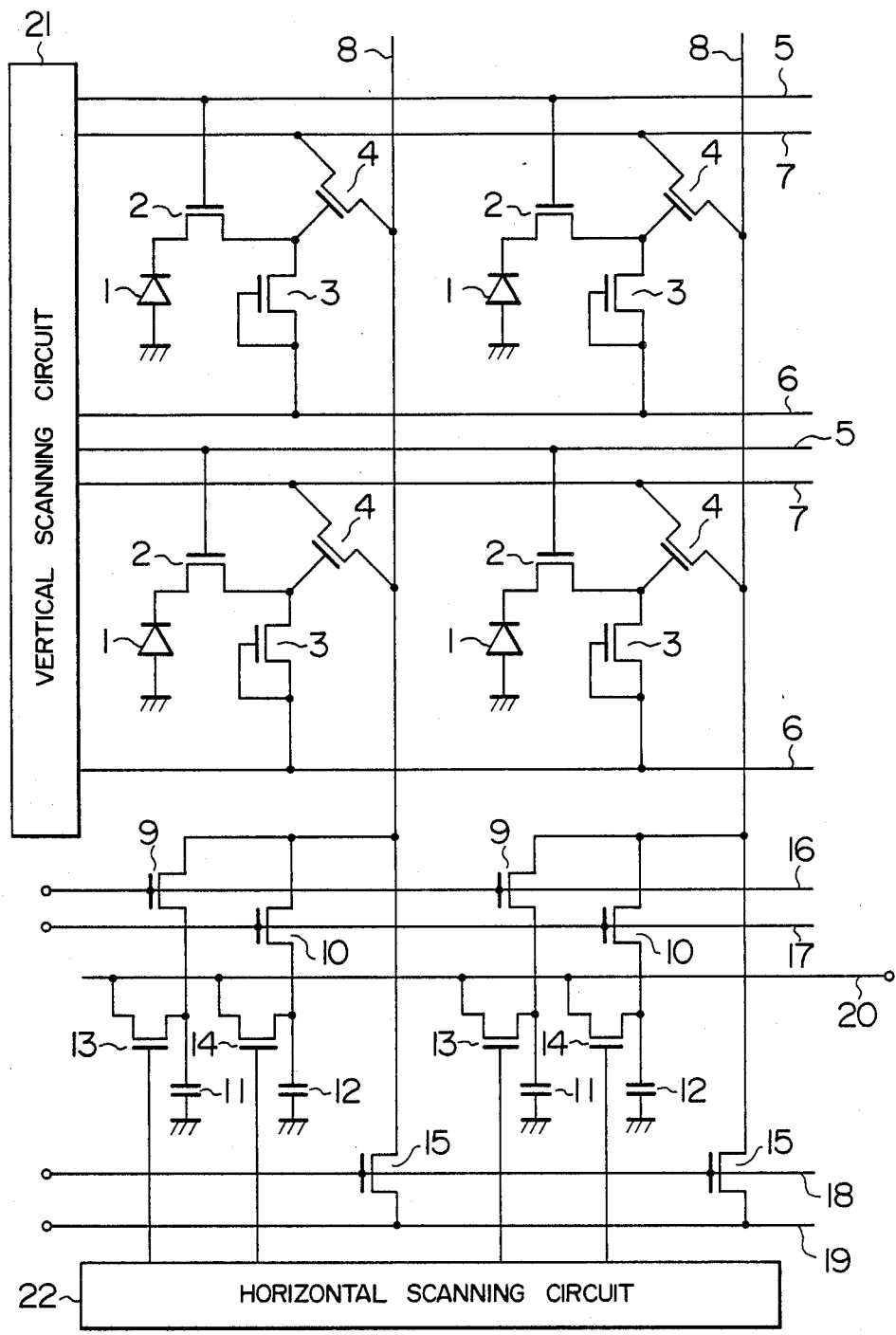
FIG. 4 is a circuit diagram showing an embodiment of a solid-state imaging device according to the present invention.

An embodiment of a solid-state imaging device according to the present invention will be explained below, with reference to FIG. 4.

In the present embodiment, each of photoelectric conversion elements is formed of a photodiode 1, and photodiodes are arranged regularly in each of horizontal and vertical directions so as to form a two-dimensional matrix. Each photodiode 1 stores an electric charge corresponding to incident light. Referring to FIG. 4, each photodiode 1 is connected to the source electrode of a vertical switching MOS transistor (hereinafter referred to as "vertical MOS transistor") 2. The gate electrodes of vertical MOS transistors 2 in the same row parallel to a horizontal line are connected to a vertical scanning circuit 21 through a vertical gate line 5. The drain electrode of the vertical MOS transistor 2 is connected to the source electrode of a reset transistor 3 and the gate electrode of a MOS transistor serving as a pixel amplifier 4. The gate and drain electrodes of the reset transistor 3 are connected to each other, and are connected to a reset line 6 which is connected to the vertical scanning circuit 21. The reset transistor 3 is put in an ON- or OFF-state in accordance with the electric potential of the reset line 6. The pixel amplifier 4 is formed of a MOS transistor. The drain electrode of the MOS transistor serving as the pixel amplifier 4 is connected to a drain line 7 which is connected to the vertical scanning circuit 21, and the source electrode of the above MOS transistor is connected to the drain electrode of a load transistor 15 through a vertical signal line 8. The pixel amplifier 4 and the load transistor 15 make up a source follower circuit. The source and gate electrodes of the load transistor 15 are connected to a load source line 19 and a load gate line 18, respectively. Storage capacitors 11 and 12 are connected to the vertical signal line 8 of the source follower circuit through gate switch transistors 9 and 10, respectively. The gate switch transistors 9 and 10 are controlled by gate lines 16 and 17, respectively. The storage capacitors 11 and 12 are connected to a horizontal signal line 20 through horizontal gate switch transistors 13 and 14, respectively. The horizontal gate switch transistors 13 and 14 are sequentially scanned by a horizontal scanning circuit (for example, horizontal register) 22.

A signal charge which is stored in each photodiode in accordance with the quantity of light incident on the photodiode, is delivered from the output side of the present embodiment in the following manner. At the beginning of a horizontal blanking period of the present embodiment, photodiodes in a row which is to be read out, are selected, and the reset line 6 corresponding to the above row is put to ON- and OFF-levels so that each of reset transistors corresponding to the above photodiodes performs a reset operation. Then, the drain line 7 is put to an ON-level. Thus, each of pixel amplifiers 4 in the above row operates as the driver transistor of a source follower circuit. At this time, the output of the source follower circuit indicates the output of the pixel amplifier 4 applied with no signal charge. This output of the source follower circuit is stored in the storage capacitor 11 through the gate switch transistor 9 in such a manner that the gate line 16 connected to the gate electrode of the gate switch transistor 9 is put to ON- and OFF-levels. Next, a vertical gate line 5 corresponding to the above row is put to ON- and OFF-levels to apply the signal charges of the photodiodes to the gate electrodes of the pixel amplifiers 4. At this time, the output signal of each source follower circuit has a signal level corresponding to the signal charge. The gate line 17 is put to ON- and OFF-levels. Thus, the output signal of each source follower circuit is stored in a storage capacitor 12 through a gate switch transistor 10. All of the above operations are performed in one horizontal blanking period. In a horizontal scanning period which follows the horizontal blanking period, a plurality of pairs of horizontal gate switches 13 and 14 are successively scanned by the horizontal register 22, and thus the outputs of source follower circuits stored in a plurality of pairs of storage capacitors 11 and 12 are successively delivered to the horizontal signal line 20. Output charges stored in a pair of storage capacitors 11 and 12 indicate the output of the pixel amplifier 4 obtained in a reset period and the output of the pixel amplifier 4 applied with the signal charge, respectively. By using the difference between the output charges of the storage capacitors 11 and 12 (that is, the difference between two kinds of outputs of the pixel amplifier 4), noise due to variations in input characteristic of source follower circuit and the 1/f noise of a source follower circuit can be readily suppressed. In the present embodiment, it is preferable to make the storage capacity of each of the capacitors 11 and 12 greater than a predetermined value. This is because when a capacitor is subjected to a switching operation, kTC-noise is generated on the basis of the thermal noise of a switching transistor. The noise level $I_{kTC}$ of kTC-noise is given by the following equation:

$$I_{kTC} = \sqrt{kTCf_Cf_B}$$

where k indicates Boltzmann's constant, T a temperature, C the capacitance of the capacitor, $f_C$ a switching frequency, and $f_B$ a bandwidth. In a case where the photodiode 1 is not completely free from charge after a read operation has been performed for the photodiode 1 with the aid of the gate switch transistor 2, the kTC-noise is generated by the capacitance $C_{PD}$ of the photodiode 1. In a case where the capacitance of each of the capacitors 11 and 12 is made equal to the capacitance $C_{PD}$ of the photodiode, the kTC-noise generated by each of the capacitors 11 and 12 will be substantially equal to that generated by the photodiode 1. While, in a case where the capacitance of each of the capacitors 11 and 12 is made one hundred times larger than the capacitance $C_{PD}$, the kTC-noise generated by the capacitor 11 or 12 is increased by a factor of ten, but the electric charge storable in the capacitor 11 or 12 is increased by a factor of one hundred. Thus, when viewed from the standpoint of signal-to-noise ratio, the kTC-noise due to the capacitor 11 or 12 is considered to be one-tenth the kTC-noise due to the capacitance $C_{PD}$. Accordingly, it is desirable to make the capacitance of each of the capacitors 11 and 12 as large as possible, provided that the source follower circuit made up of the pixel amplifier 4 and the load transistor 15 is normally operated. Further, when a circuit design is made so that the photodiode 1 becomes completely free from charge after a read operation has been performed for the photodiode 1 with the aid of the gate switch transistor 2, the generation of kTC-noise due to the capacitance $C_{PD}$ can be suppressed.

Figure 5:
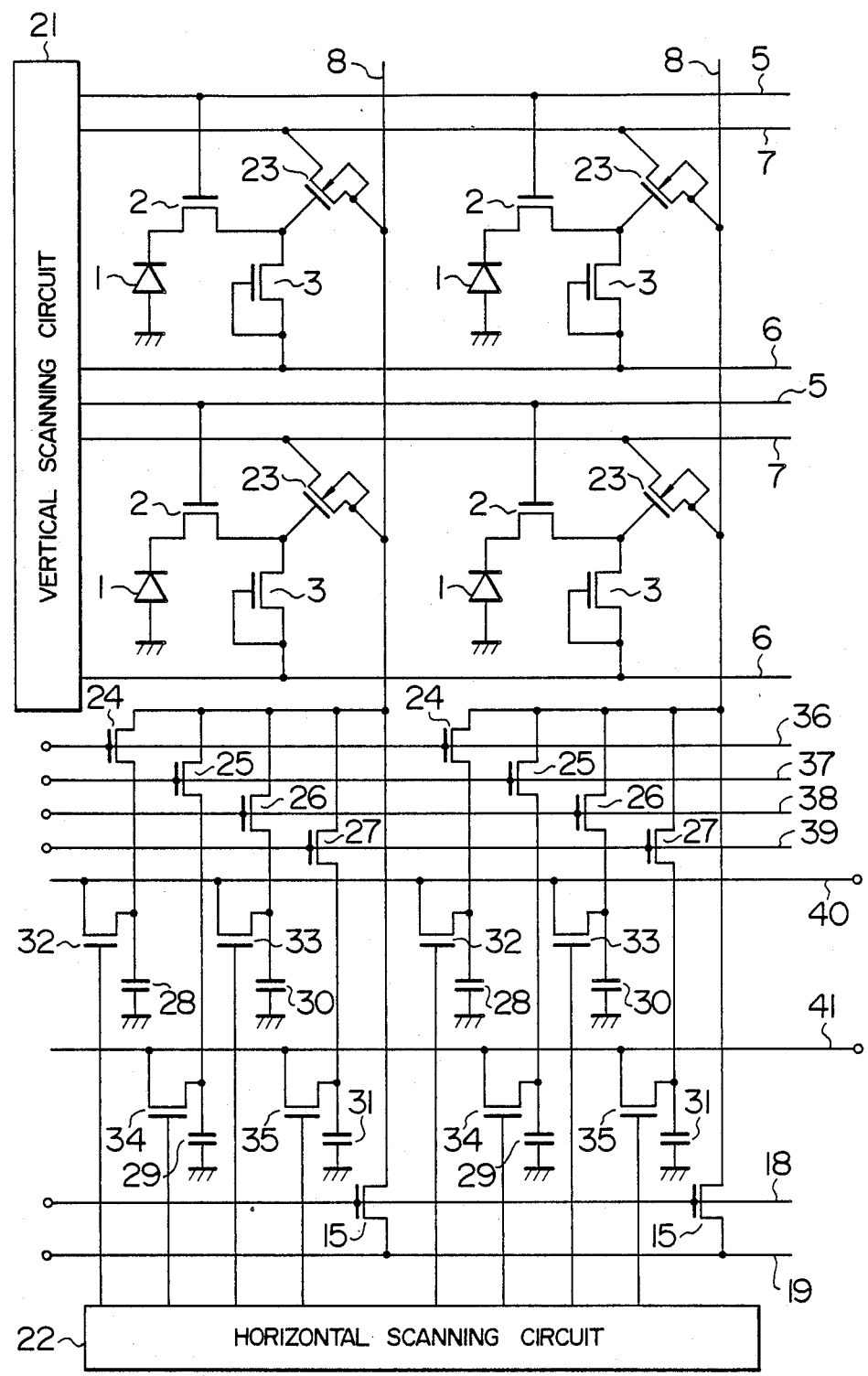
FIG. 5 is a circuit diagram showing another embodiment of a solid-state imaging device according to the present invention.

Now, explanation will be made of another embodiment of a solid-state imaging device according to the present invention, with reference to FIG. 5. The present embodiment is identical with the embodiment of FIG. 4, except that four gate switch transistors 24 to 27, four storage capacitors 28 to 31 and four horizontal gate switches 32 to 35 are used, and the well of a transistor serving as a pixel amplifier 23 is connected to the source electrode of the transistor. The present embodiment has two advantages. That is, photodiodes in two adjacent rows can be read out at once, and a phenomenon that variations in structure of the well of the pixel amplifier 23 generate variations in gain of the pixel amplifier on the basis of the back bias effect, can be prevented, since the well and the source electrode of the pixel amplifier 24 are kept at the same potential. As to the former item, photodiodes in two adjacent rows can be read out at once in such a manner that the outputs of pixel amplifiers in two adjacent rows are stored in a plurality of sets of storage capacitors 28 to 31 in a horizontal blanking period, and are fetched from these storage capacitors to the horizontal signal lines 40 and 41 in a horizontal scanning period. As to the latter item, it is preferable to form the well of the pixel amplifier 23 separately from other circuit elements of each pixel by the SOI (silicon on insulator) method or the like, thereby reducing the area of the pixel amplifier 23.

Figure 6:
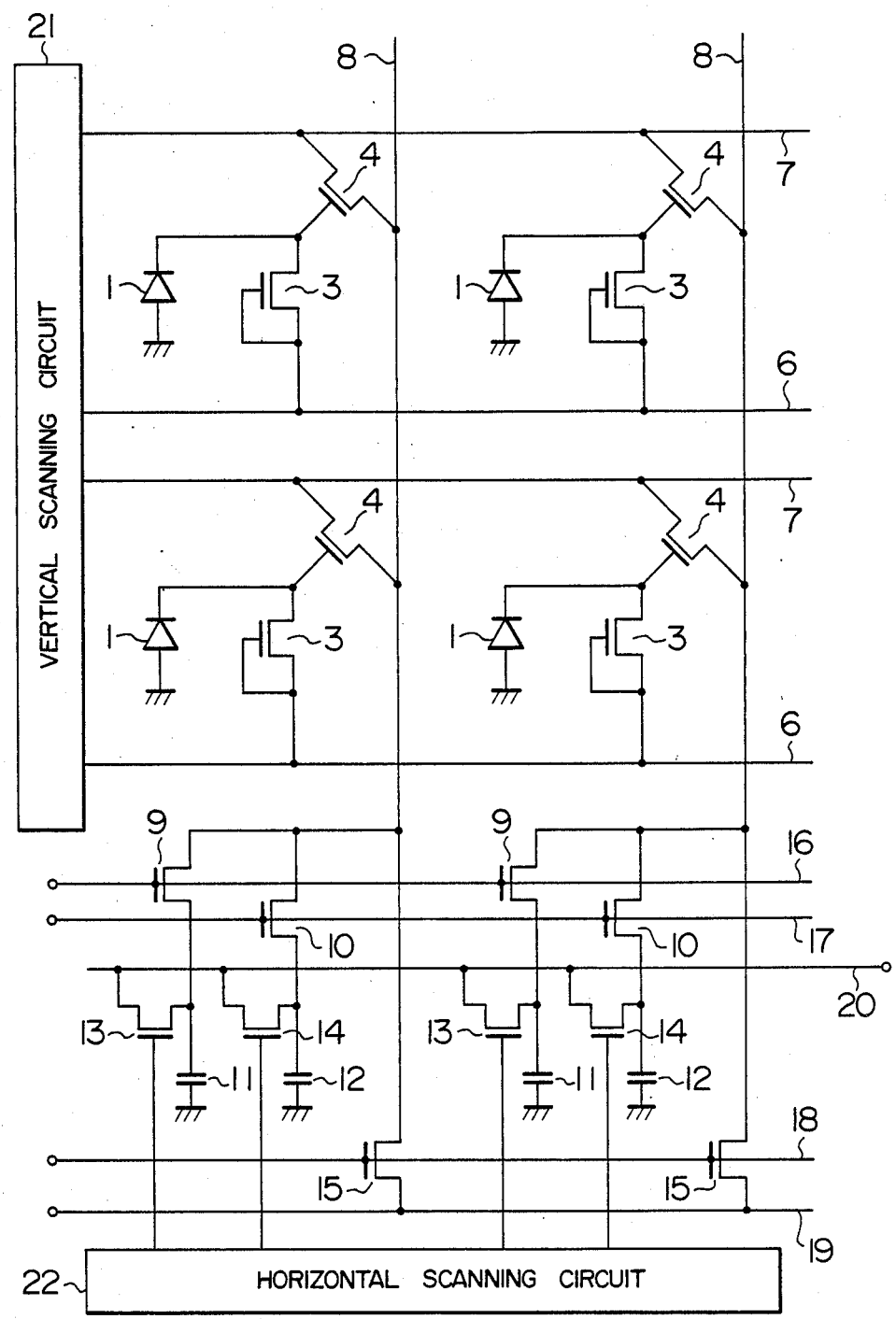
FIG. 6 is a circuit diagram showing a further embodiment of a solid-state imaging device according to the present invention.

Next, explanation will be made of a further embodiment of a solid-state imaging device according to the present invention, with reference to FIG. 6. The present embodiment is identical with the embodiment of FIG. 4, except that the vertical gate switch transistor (namely, vertical switching MOS transistor) 2 is absent. In the present embodiment, after the output of the pixel amplifier 4 applied with the signal charge has been stored in the storage capacitor 11, a reset operation is performed for the input of the pixel amplifier 4 with the aid of the reset switch 3, and the output of the pixel amplifier 4 is stored in the storage capacitor 12. In this case, reset noise is generated on the basis of variations in reset level of reset operation, but each pixel is simplified in structure.

Figure 7:
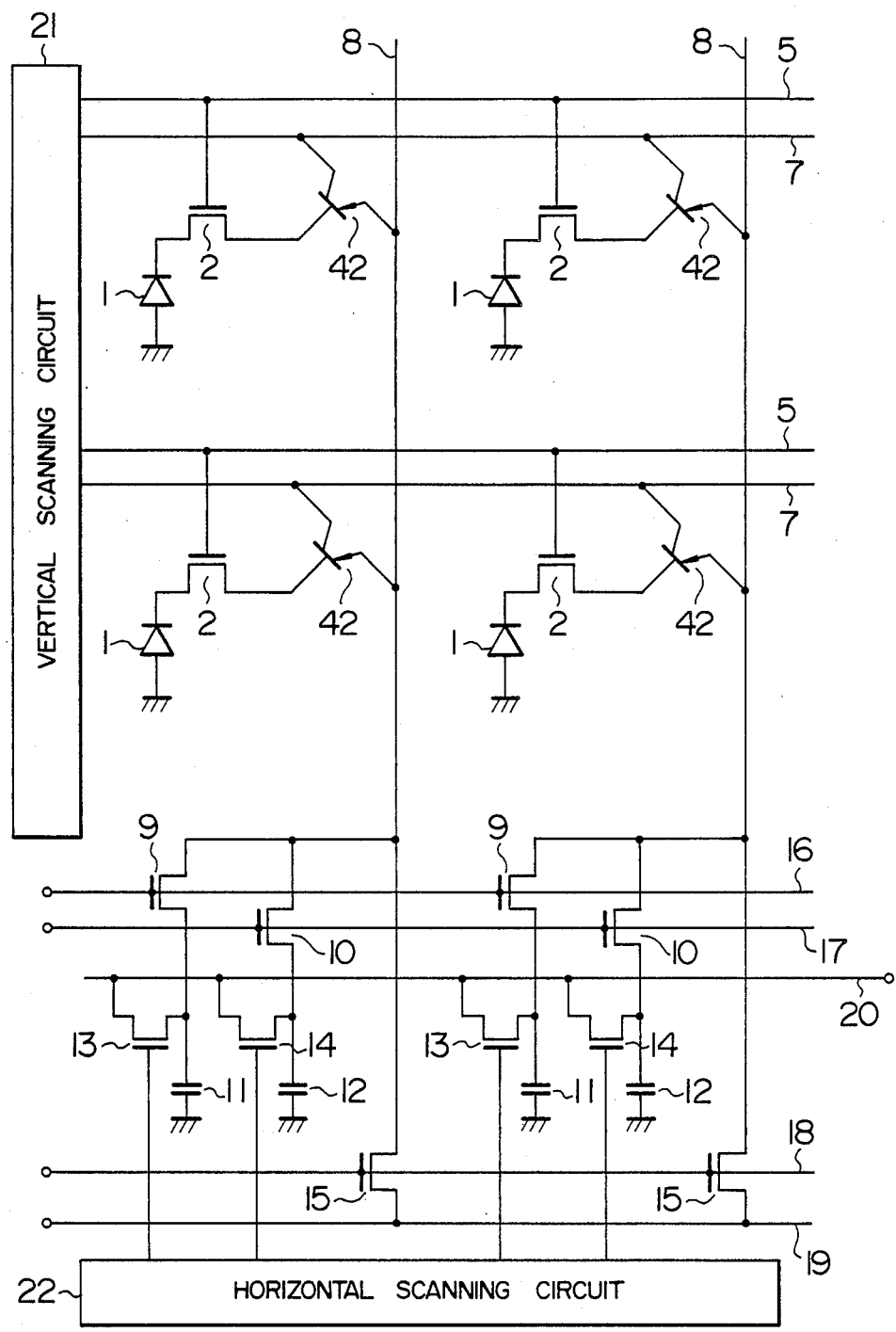
FIG. 7 is a circuit diagram showing still another embodiment of a solid-state imaging device according to the present invention.

Next, explanation will be made of still another embodiment of a solid-state imaging device according to the present invention, with reference to FIG. 7. The present embodiment is identical with the embodiment of FIG. 4, except that a pixel amplifier 42 is formed of a bipolar transistor and the reset transistor is absent. In a bipolar transistor, the 1/f noise is increased. However, each pixel of the present embodiment is simplified in structure since the reset transistor is not formed.

Even if the conductivity type of each of semiconductor layers used in the above embodiments is reversed, effects similar to those obtained by each embodiment will be obtained.

In the above embodiments, a solid-state imaging device including 2×2 pixels has been explained by way of example. It is needless to say that the present invention is applicable to a solid-state imaging device including n×m pixels.

Figure 8:
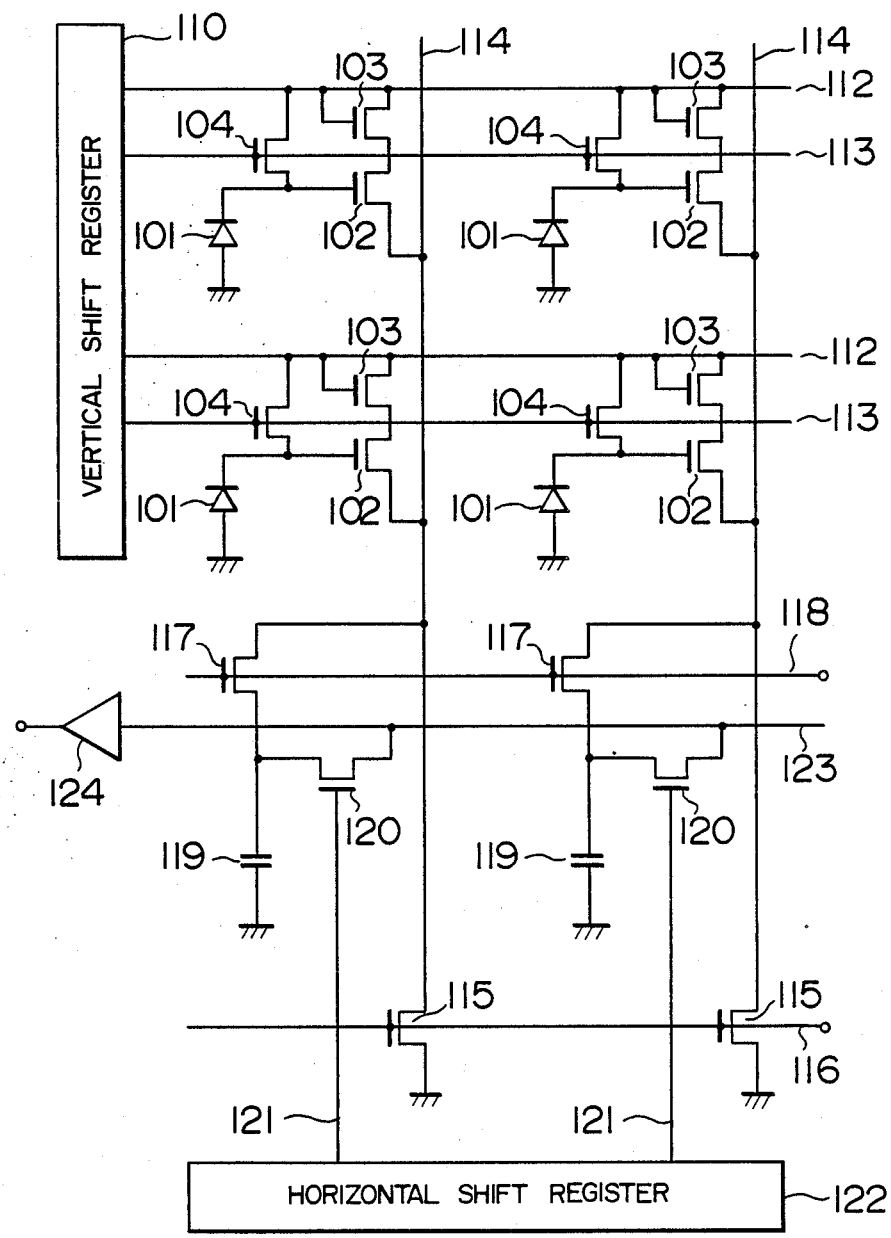
FIG. 8 is a circuit diagram showing still a further embodiment of a solid-state imaging device according to the present invention.

Next, explanation will be made of still a further embodiment of a solid-state imaging device according to the present invention, with reference to FIG. 8. FIG. 8 is a circuit diagram showing the above embodiment. Referring to FIG. 8, each of pixels which are arranged on a light receiving surface so as to form a two-dimensional matrix, includes a photodiode 101 acting as a photoelectric conversion element, a pixel amplifier 102 formed of an MOS transistor for amplifying the output voltage of the photodiode 101, a vertical switching transistor 103 connected between the pixel amplifier 102 and a vertical drain line 112, and a reset transistor 104 for resetting the photodiode 101. The gate electrode of the pixel amplifier 102 and the source electrode of the reset transistor 104 are connected to the photodiode 101.

The drain electrode of the reset transistor 104 and the drain and gate electrodes of the vertical switching transistor 103 are connected to the vertical drain line 112. The drain electrode of the pixel amplifier 102 is connected to the source electrode of the vertical switching transistor 103, and the source electrode of the pixel amplifier 102 is connected to a vertical signal line 114. The vertical drain line 112 and a vertical gate line 113 connected to the gate electrode of the reset transistor 104 are both selected by the vertical scanning operation of a vertical shift register 110. One end of the vertical signal line 114 is connected to a semiconductor region having a well potential through a signal reset switching-transistor 115 whose gate is controlled by a signal reset gate line 116. Further, the vertical signal line 114 is connected to a storage capacitor 119 through a capacitor switching transistor 117 whose gate is controlled by a capacitor gate line 118. The storage capacitor 119 is connected to a horizontal scanning line 123 through a horizontal switching transistor 120. The gate electrode of the horizontal switching transistor 120 is connected to a horizontal shift register 122 through a horizontal gate line 121, and the horizontal switching transistor 120 is selected by the horizontal scanning operation of the horizontal shift register 122.

Next, the operation of the present embodiment will be explained below. Light incident on the light receiving surface is subjected to photoelectric conversion in a semiconductor layer. Thus, a signal charge is generated in the photodiode 101 and stored therein.

In a horizontal blanking period, one vertical drain line 112 is put to a high potential level on the basis of the scanning operation of the vertical shift register 110, to turn on a vertical switching transistor 103 whose gate and drain electrodes are connected to the above vertical drain line 112. Thus, the pixel amplifier 102 connected to the source electrode of the vertical switching transistor 103 is operated. At this time, the capacitor gate line 118 is put to a high potential level, to turn on the capacitor switching transistor 117. Thus, an amplified signal charge from the pixel amplifier 102 is sent through the vertical signal line 114 to the capacitor 119, to be stored therein. After the amplified signal charge has been stored in the capacitor 119, the capacitor switching transistor 117 is turned off.

In the horizontal scanning period which follows the horizontal blanking period, horizontal switching transistors 120 are successively turned on by a horizontal scanning signal which is supplied from the horizontal shift register 122 to horizontal gate lines 121. Thus, the outputs of storage capacitors 119 are successively applied to an output amplifier 124 through the horizontal signal line 123 and one of the horizontal switching transistors 120. That is, the amplified signal charges stored in the capacitors 119 are successively delivered.

A read-out operation is performed in the above-mentioned manner. A photodiode 101 can be reset in the following manner. The vertical gate line 113 in the n-th row is applied with a reset signal from the vertical shift register 110 at a desired time to turn on the reset transistors 104 in the n-th row, thereby resetting the photodiodes 101 in the n-th row. At this time, the vertical drain line 112, to which the drain electrodes of the reset transistors 104 are connected, is required to have a high potential. However, in a case where the gate and drain electrodes of each of the reset transistors 104 are connected to the vertical gate line 113, the photodiodes 101 can be reset independently of the potential level of the vertical drain line 112. Further, it is possible to vary a time when the photodiodes 101 are reset, that is, the signal charge storing time of each photodiode can be varied. Accordingly, the present embodiment can perform an imaging operation in a focal plane electronic shutter mode. Further, at the beginning of the horizontal blanking period, the signal reset gate line 116 is put to a high potential level to turn on the signal reset switching transistor 115, thereby resetting the vertical signal line before the amplified signal charge is sent to the capacitor 119.

According to the structure of the present embodiment, the output of the pixel amplifier 102 is delivered in such a manner that the capacitor 119 charges up for a predetermined time. Accordingly, a high frequency component generated in the pixel amplifier 102 is decreased. That is, the present embodiment can lower the noise level.

In the present embodiment, the gain of the amplified signal charge made by the pixel amplifier 101 to the signal charge produced by the photodiode 101, is determined by a ratio of the capacitance of the capacitor 119 to the total capacitance at the gate of the pixel amplifier 101. Accordingly, it is preferable to make this capacitance ratio as large as possible provided that it does not take too much time for the capacitor 119 to charge up.

In the above explanation, a pixel which is to be read out, is selected by the vertical shift register 110 and the horizontal shift register 122. However, it is not always required to use the shift registers 110 and 122, but each of these shift registers may be replaced by any pixel selecting circuit. Further, in FIG. 8, the source electrode of the signal reset switching transistor 115, one electrode of the capacitor 119, and one electrode of the photodiode 101 are connected to a semiconductor region having a well potential. Alternatively, these electrodes may be connected to a potential source. It is not always required to form the signal reset switching transistor 115 at one end of the vertical signal line 114, but the switching transistor 115 may be formed at a desired place other than the light receiving surface. Further, the photodiode 101 is not required to be a diode having a PN junction, but may be a photodetector having an MOS structure. The present embodiment is not limited to an imaging device having 2×2 pixels, but is applicable to an imaging device having a desired number of pixels. Further the conductivity type of each of semiconductor layers included in the present embodiment may be reversed, provided that the polarity of each of applied voltages or potentials is reversed. It is not required to construct the present embodiment of silicon, but the present embodiment may be made of other semiconductor materials. The above changes can produce substantially the same effects as the present embodiment, and hold in other embodiments of the present invention.

Figure 9:
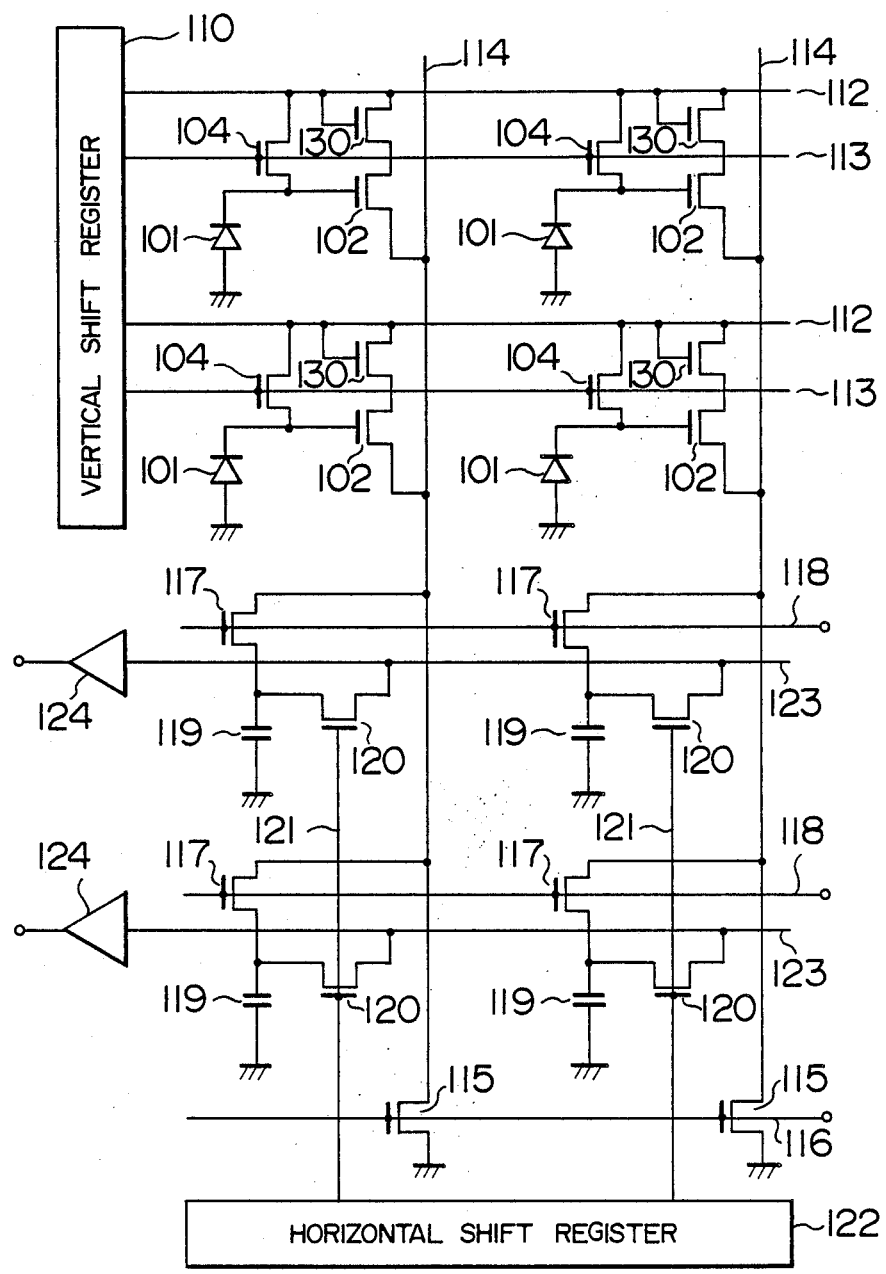
FIG. 9 is a circuit diagram showing yet another embodiment of a solid-state imaging device according to the present invention which embodiment is a modified version of the embodiment of FIG. 8.

Next, explanation will be made of yet another embodiment of a solid-state imaging device according to the present invention, with reference to FIG. 9. The present embodiment is a modified version of the embodiment of FIG. 8. That is, the present embodiment shown in FIG. 9 is identical with the embodiment of FIG. 8, except that first and second capacitor portions each made up of the capacitor switching transistors 117, the capacitor gate line 118, the storage capacitors 119, the horizontal switching transistors 120, the horizontal signal line 123 and the output amplifier 124, are arranged in upper and lower rows, respectively.

Accordingly, the operation of the present embodiment is identical with that of the embodiment of FIG. 8, except that a plurality of pairs of amplified signal charges from pixel amplifiers 102 in two adjacent rows are successively to a plurality of pairs of capacitors 119 in a horizontal blanking period in such a manner that the amplified signal charges from a pair of pixel amplifiers 102 in two adjacent rows are simultaneously stored in a pair of capacitors 119, and the amplified signal charges stored in a pair of capacitors 119 are simultaneously read out in the horizontal scanning period which follows the horizontal blanking period.

According to the present embodiment, images in two adjacent rows are read out at once without performing interface scanning. Hence, a picture image obtained by the present embodiment is superior in dynamic resolution to a picture image which is obtained on the basis of interface scanning.

Figure 10:
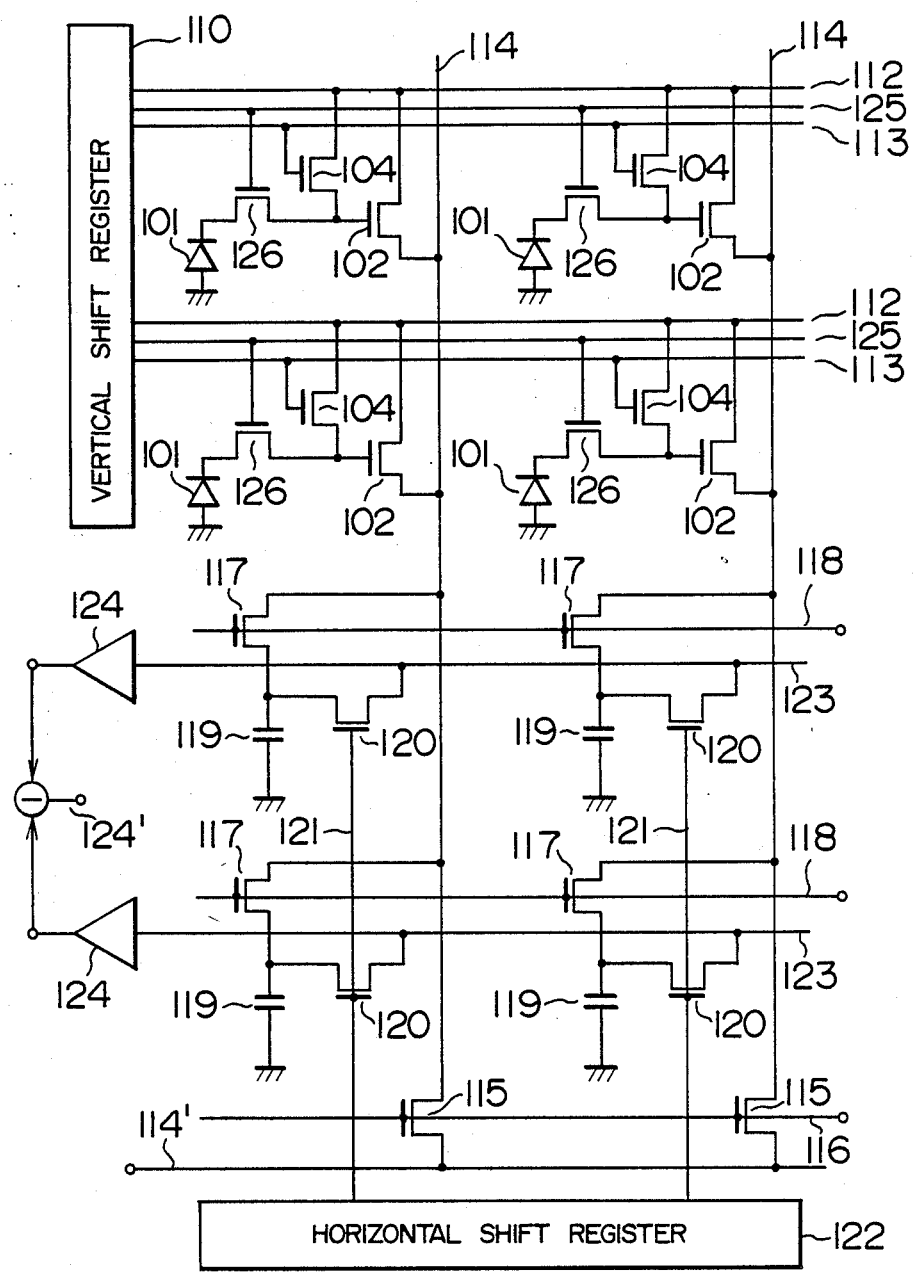
FIG. 10 is a circuit diagram showing yet a further embodiment of a solid-state imaging device according to the present invention which embodiment is another modified version of the embodiment of FIG. 8.

Next, explanation will be made of yet a further embodiment of a solid-state imaging device according to the present invention, with reference to FIG. 10. The present embodiment is another modified version of the embodiment of FIG. 8. That is, the present embodiment shown in FIG. 10 is identical with the embodiment of FIG. 9, except that the vertical switching transistor 103 is omitted from each pixel, a photo-gate transistor 126 which is selected by the horizontal shift register 110 through a photo-gate line 125, is connected between the photodiode 101 and the gate electrode of the pixel amplifier 102, the source electrode of the signal reset switching transistor 115 whose drain electrode is connected to the vertical signal line 114, is connected to a signal reset line 114', and the difference between the outputs of two output amplifiers 124 is delivered to an output terminal 124'.

Now, the operation of the present embodiment will be explained below. Light incident on a light receiving surface is subjected to photoelectric conversion in a semiconductor layer. Thus, a signal charge is generated in the photodiode 101 and stored therein.

At the beginning of a horizontal blanking period, in order to reset the gate electrodes of pixel amplifiers 102 in the n-th row, the vertical drain line 112 and vertical gate line 113 corresponding to pixels in the n-th row are put to a high potential level, and the signal reset gate line 116 and the signal reset line 114' are also put to a high potential level. In more detail, the vertical drain line 112 and the vertical gate line 113 are put to a high potential level, to turn on the reset transistor 104. The signal reset gate line 116 and the signal reset line 114' are put to a high potential level, to put the vertical signal line 114 to a high potential level on the basis of the ON-state of the signal reset switching-transistor 115, thereby preventing the pixel amplifier 102 from being operated. When the pixel amplifier 102 is operated, a relatively large current flows through the gate drain line 112 instantaneously, and thus a voltage drop in the gate drain line 112 becomes too large to be neglected. Such a voltage drop will be a hindrance to the reset operation for the gate electrode of the pixel amplifier 102.

Thereafter, each of the vertical drain line 112, the vertical gate line 113, the signal reset gate line 116 and the signal reset line 114' is put to a low potential level, and then the outputs of pixel amplifiers 102 whose gate electrodes have been subjected to the reset operation, are sent to the storage capacitors 119 in the following manner. The vertical drain line 112 is put to a high potential level on the basis of a signal from the vertical shift register 110, to operate pixel amplifiers 102 connected to this vertical drain line 112. At this time, the capacitor gate line 118 of the first capacitor portion disposed in the upper row is put to a high potential level, to turn on the capacitor switching transistor 117 of the first capacitor portion. Thus, the output charges from the pixel amplifiers 102 are sent through the vertical signal lines 114 to the storage capacitors 119 of the first capacitor portion, to be stored in these storage capacitors 119. After the output charges have been stored in the storage capacitors 119, the capacitor switching transistors of the first capacitor portion are turned off.

Then, the photo-gate line 125 is put to a high potential level, to turn on the photo-gate transistors 126, thereby sending the signal charges of the photodiodes 101 to the gate electrodes of the pixel amplifiers 102. The above operation, also, serves as the reset operation for the photodiodes 101. When each photodiode 101 is constructed so that the photodiode is completely free from an electric charge after the signal charge has been sent from the photodiode to the pixel amplifier 102, it is possible to remove reset noise which is generated by the residual charge in the photodiode, and to remove an after image.

Thereafter, the outputs of the pixel amplifiers 102 are again sent to storage capacitors. It is needless to say that the amplified signal charges from the pixel amplifiers 102 applied with the signal charges of the photodiodes 101 are sent to the storage capacitors 119 of the second capacitor portion disposed in the lower row.

In the horizontal scanning period which follows the horizontal blanking period, a plurality of pairs of horizontal switching transistors 120 are successively turned on by the horizontal scanning operation of the horizontal shift register 122. Thus, the outputs of the storage capacitors 119 included in each of the first and second capacitor portions are successively applied to one of the output amplifiers 124 through one of the horizontal signal lines 123 and one of the horizontal switching transistors 120. That is, the output charges or amplified signal charges stored in the storage capacitors 119 are successively sent to the output amplifier 124.

At this time, the outputs of two output amplifiers 124 correspond to the output charge which is obtained at a time the gate electrode of the pixel amplifier 102 is reset, and the amplified signal charge which is obtained at a time the signal charge is supplied from the photodiode 101 to the pixel amplifier 102. The difference between the outputs of two output amplifiers 124 is delivered to an output terminal 124'.

As mentioned above, the present embodiment can deliver the difference between an amplified signal which is obtained at a time the gate electrode of the pixel amplifier 102 is reset, and an amplified signal which is obtained at a time the signal electrode is applied to the pixel amplifier 102. According, the present embodiment has advantages that reset noise caused by resetting the gate electrode of the pixel amplifier and a low frequency component of noise generated in the pixel amplifier 102 can be suppressed.

In the present embodiment, the first and second capacitor portions are disposed in two rows. Alternatively, the first to fourth capacitor portions each having the same circuit configuration may be disposed in four rows. In this case, images in two adjacent rows can be read out at once as in the embodiment of FIG. 9, and moreover the advantages of the present embodiment can be obtained.

Figure 11:
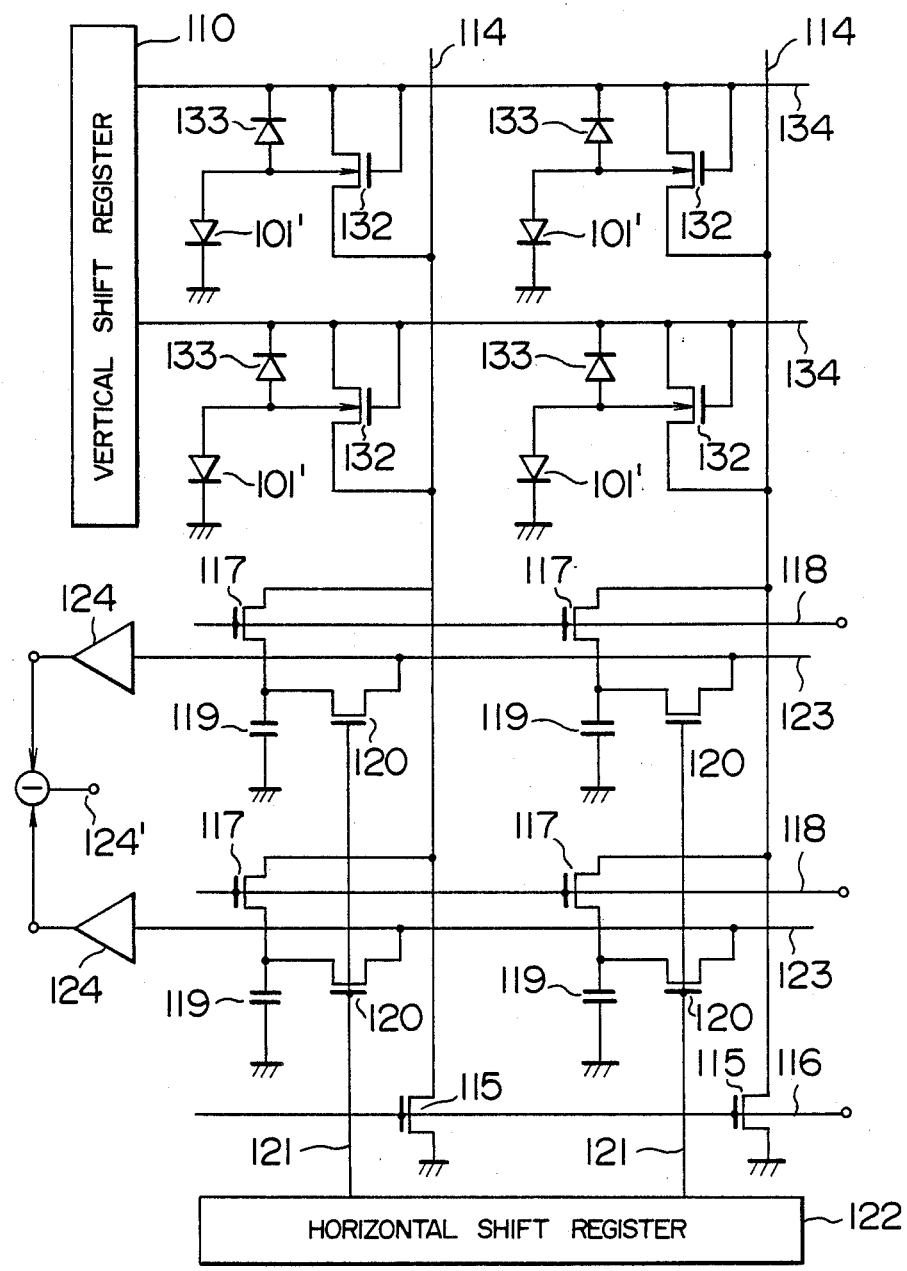
FIG. 11 is a circuit diagram showing a variant form of the embodiment of FIG. 10.

Next, explanation will be made of yet still another embodiment of a solid-state imaging device according to the present invention, with reference to FIG. 11. The present embodiment is a variant form of the embodiment of FIG. 10. That is, the present embodiment shown in FIG. 11 is identical with the embodiment of FIG. 10, except that a photodiode 101' included in each pixel is so connected as to be opposite in current flowing direction to the photodiode 101 of FIG. 10, the gate and drain electrodes of a pixel amplifier 132 are connected to a vertical drain line 134, the photodiode 101' is connected to the well of the pixel amplifier 132, all of the photo-gate transistor 126, the vertical gate line 113 and the photo-gate line 125 are absent, a reset diode 133 is used in place of the reset transistor 104, and the signal reset line 114' is absent.

The operation of the present embodiment will be explained below. Light incident on a light receiving surface is subjected to photoelectric conversion in a semiconductor layer. Thus, a signal charge is generated in the photodiode 101' and stored therein.

In a horizontal blanking period, one vertical drain line 134 corresponding to pixels in a row is put to a high potential level, to operate a pixel amplifier 132 whose gate and drain electrodes are connected to the vertical drain line 134. At this time, the capacitor gate line 118 of the first capacitor portion disposed in the upper row is put to a high potential level, to turn on the capacitor switching transistors 117 of the first capacitor portion. Then, the amplified signal charge from the pixel amplifier 132 is sent through the vertical signal line 114 to a capacitor 119 of the first capacitor portion, to be stored in the capacitor 119. At this time, the signal charge stored in the photodiode 101' is applied to the pixel amplifier 132 in the form of a change in back gate voltage. After the amplified signal charge has been stored in the capacitor 119, the capacitor switching transistor 117 is turned off.

Next, a reset operation is performed for photodiodes 101' in the above row in the following manner. The potential of the vertical drain line 134 is set so that the vertical drain line 134 is at a negative potential with respect to the photodiodes 101', to bias a reset diode 133 in the forward direction. When the PN junction formed between the gate and well of the pixel amplifier 132 is used as the reset diode 133, the structure of each pixel is simplified. When the photodiode 101' is constructed so that the photodiode 10' becomes completely free from an electric charge after the reset operation has been performed for the photodiode 101', reset noise which is generated by a residual charge in the photodiode 101', and an after image can be removed, as in the abovementioned embodiments.

Thereafter, the outputs of the pixel amplifiers 132 in the above row are again sent to storage capacitors 119. It is to be noted that the output charges from the pixel amplifiers 132 in a reset period are sent to the storage capacitors 119 of the second capacitor portion disposed in the lower row.

In the horizontal scanning period which follows the horizontal blanking period, an output signal is delivered to the output terminal 124'. The output operation of the present embodiment is the same as that of the embodiment of FIG. 10, and hence the explanation of output operation will be omitted. Further, the reset operation for the vertical signal line 114 is the same as in the embodiment of FIG. 8.

According to the present invention, the difference between the outputs of two output amplifiers 124 is delivered to the output terminal 124', as in the embodiment of FIG. 10. Accordingly, a low frequency component of noise generated in the pixel amplifier 132 can be suppressed. In the present embodiment, the first and second capacitor portions are disposed in the upper and lower rows, respectively. Alternatively, first to fourth capacitor portions each having the same circuit configuration may be disposed in four rows, to read out images in two adjacent rows at once as in the embodiment of FIG. 9. Further, the present embodiment has an advantage that each pixel is relatively simple in structure and can be made small in size. Accordingly, the present embodiment is suited to form a multi-pixel solid-state imaging device corresponding to high precision imaging (namely, high definition imaging).

Figure 12:
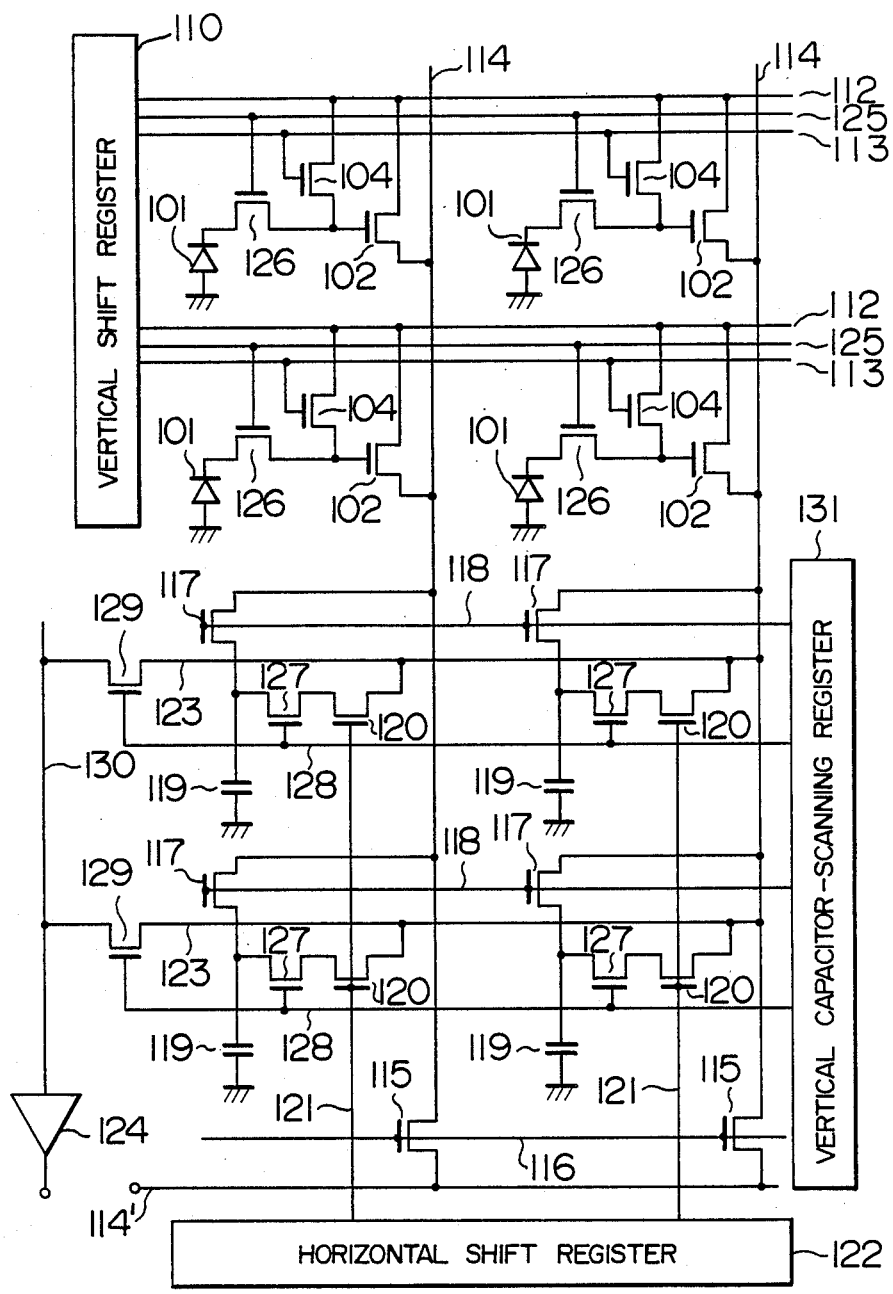
FIG. 12 is a circuit diagram showing another variant form of the embodiment of FIG. 10.

Next, explanation will be made of yet still a further embodiment of a solid-state imaging device according to the present invention, with reference to FIG. 12. The present embodiment is another variant form of the embodiment of FIG. 10. That is, the present embodiment shown in FIG. 12 is identical with the embodiment of FIG. 10, except that the number of storage capacitors 119 is equal to the number of pixels, a vertical switching transistor 127 is connected between the storage capacitor 119 and the horizontal switching transistor 120 and selected by a scanning signal which is supplied from a vertical capacitor-scanning register 131 to the vertical switching transistor 127 through a vertical capacitor gate line 128, each of horizontal signal lines 123 is connected to a vertical amplifier signal line 130 through a read switching transistor 129 which is selected by the scanning signal from the vertical capacitor gate line 128, and one end of the vertical amplifier signal line 130 is connected to an output amplifier 124.

The operation of the present embodiment will be explained below. In the present embodiment, the output charges and amplified signal charges from all the pixel amplifiers 102 are continuously sent to the storage capacitors 119 in a vertical blanking period. A method of storing the output of a pixel amplifier 102 in a storage capacitor 119 is the same as in the embodiment of FIG. 10.

It is to be noted that only one of a capacitor part for storing amplified signal charges from the pixel amplifiers 102 applied with signal charges and a capacitor part for storing output charges which are supplied from the pixel amplifiers 102 in a reset period.

Next, the operation of the present embodiment in a vertical scanning period will be explained. In the vertical scanning period, the vertical switching transistors 127 and the read switching transistors 129 are scanned in a vertical direction by a scanning signal which is supplied from the vertical capacitor-scanning register 131 to the vertical capacitor gate lines 128, and the horizontal switching transistors 120 are scanned in a horizontal direction by another scanning signal which is supplied from the horizontal shift register 122 to the horizontal gate lines 121. Thus, the output charges or amplified signal charges stored in the capacitors 119 are successively sent to the output amplifier 124 through the vertical amplifier signal line 130 and one of the horizontal signal lines 123.

The vertical signal line 114 is reset in such a manner that the signal reset gate line 116 is put to a high potential level and thus the signal reset switching transistor 115 is turned on. This reset operation can be performed at a desired time other than a time when the amplified signal charge is sent from the pixel amplifier 102 to the capacitor 119. Further, the photodiode 101 is reset in such a manner that the photo-gate line 125 is put to a high potential level, and thus the photo-gate transistor 126 is turned on. That is, a time when the photodiode 101 is reset, can be appropriately changed. Accordingly, the photo-signal accumulating time of the photodiode 101, without altering a state that all the photodiodes have the same photo-signal accumulating time. The operation is the electronic shutter operation of the present embodiment. In the embodiments other than the present embodiment, an electronic shutter operation corresponds to a focal plane shutter for scanning the whole image surface for a period corresponding to one field, and hence an image at pixels disposed in the lowermost row is sent to the capacitors 119 when the period corresponding to one field has elapsed after an image at pixels disposed in the uppermost row was sent to the capacitors 119. While, the electronic shutter operation of the present embodiment corresponds to a focal plane shutter capable of scanning the whole image surface in that operation period of the pixel amplifier 102 which is set in a vertical blanking period, and hence a time interval between a time when the image at pixels in the uppermost row is sent to the capacitors 119 and a time when the image at pixels in the lowermost row is sent to the capacitors 119, is far shorter than that in other embodiments.

We claim:

1. A solid-state imaging device comprising:
   a plurality of photoelectric conversion elements arranged so as to form a two-dimensional matrix, for storing signal charges corresponding to incident light;
   a first signal line for transferring the signal charges of photoelectric conversion elements in a predetermined column, in a column direction;
   first switch means for transferring the signal charge stored in one of the photoelectric conversion elements to the first signal line, the first switch means stored in the one photoelectric conversion element into an amplified signal which is either a current signal or a voltage signal and for delivering the amplified signal to the first signal line, selection/switch means for selecting a predetermined one of the photoelectric conversion elements in the predetermined column to supply the signal charge of the selected photoelectric conversion element to the input part of the amplifier means, and reset means for resetting the electric charge in the input part of the amplifier means;
   a second signal line for transferring the signal charge which is supplied from the first signal line, to an output terminal;
   second switch means for transferring the signal charge on the first signal line to the second signal line, the second switch means being made up of a plurality of storage means for storing the output charge of the amplifier means at a time the electric charge in the input part of the amplifier means is reset by the reset means and for storing the output charge of the amplifier means at a time the signal charge of the photoelectric conversion element is applied to the amplifier means, and transfer/switch means for transferring the output charges which are stored in plural storage means, successively to the second signal line; and
   first and second scanning means for scanning each of the first and second switch means in a predetermined order.

2. A solid-state imaging device according to claim 1, wherein the selection/switch means is formed of a first MOS transistor, the first and gate electrodes of the first MOS transistor are connected to the photoelectric conversion element and the first scanning means, respectively, and the second electrode of the first MOS transistor is connected to the amplifier means and the reset means,
   wherein the amplifier means is formed of a second MOS transistor, and the first, gate and second electrodes of the second MOS transistor are connected to the first scanning means, the second electrode of the first MOS transistor, and the first signal line, respectively, and wherein the reset means is formed of a third MOS transistor, the first electrode of the third MOS transistor is connected to the second electrode of the first MOS transistor, and the gate and second electrodes of the third MOS transistor are connected to the first scanning means.

3. A solid-state imaging device according to claim 1, wherein each of plural storage means is formed of a series combination of a first MOS transistor and a capacitive element connected to the second electrode of the first MOS transistor, the first electrode of the first MOS transistor is connected to the first signal line, and the first MOS transistor is turned on or off in accordance with the potential of a gate line connected to the gate electrode of the first MOS transistor, and wherein the transfer/switch means is formed of a second MOS transistor, and the first, second, and gate electrodes of the second MOS transistor are connected to the second electrode of the first MOS transistor, the second signal line, and the second scanning means, respectively.

4. A solid-state imaging device according to claim 3, wherein two storage means are connected to the first signal line in parallel, and the output charges stored in two storage means are transferred to the second signal line independently of each other with the aid of the transfer/switch means.

5. A solid-state imaging device according to claim 2, wherein the well of the second MOS transistor is connected to the second electrode of the second MOS transistor to keep the well and second electrode of the second MOS transistor at the same potential.

6. A solid-state imaging device according to claim 3, wherein a pair of second signal lines are used, four storage means are connected to the first signal line in parallel, output charges from two photoelectric conversion elements in the predetermined column, two predetermined adjacent rows of the matrix are stored in four storage means in a horizontal blanking period, and the output charges stored in four storage means are transferred to two second signal lines independently of each other by means of the transfer/switch means, to perform a read operation for the predetermined adjacent rows at once.

7. A solid-state imaging device comprising:
a plurality of photoelectric conversion elements arranged so as to form a two-dimensional matrix, for storing signal charges corresponding to incident light;
a first signal line for transferring the signal charges of photoelectric conversion elements in a predetermined column, in a column direction;
first switch means for transferring the signal charge stored in one of the photoelectric conversion elements to the first signal line, the first switch means including amplifier means for amplifying the signal charge stored in said one photoelectric conversion element into an amplified signal which is either a current signal or a voltage signal and for delivering the amplified signal to the first signal line, and reset means for resetting the electric charge in the input part of the amplifier means;
a second signal line for transferring the signal charge which is supplied from the first signal line, to an output terminal;

second switch means for transferring the signal charge on the first signal line to the second signal line, the second switch means being made up of a plurality of storage means for storing the output charge of the amplifier means at a time the electric charge in the output part of the amplifier means is reset by the reset means and for storing the output charge of the amplifier means at a time the signal charge of the photoelectric conversion element is applied to the amplifier means, and transfer/switch means for transferring the output charges which are stored in plural storage means, successively to the second signal line; and first and second scanning means for scanning each of the first and second switch means in a predetermined order.

8. A solid-state imaging device according to claim 7, wherein the amplifier means is formed of a first MOS transistor, and the first, gate and second electrodes of the first MOS transistor are connected to the first scanning means, the photoelectric conversion element and the first signal line, respectively, and wherein the reset means is formed of a second MOS transistor, the first electrode of the second MOS transistor is connected to the gate electrode of the first MOS transistor, and the gate and second electrodes of the second MOS transistor are connected to the first scanning means.

9. A solid-state imaging device according to claim 7, wherein each of plural storage means is formed of a series combination of a first MOS transistor and a capacitive element connected to the second electrode of the first MOS transistor, the first electrode of the first MOS transistor is connected to the first signal line, and the first MOS transistor is turned on or off in accordance with the potential of a gate line connected to the gate electrode of the first MOS transistor, and wherein the transfer/switch means is formed of a second MOS transistor, and the first, second and gate electrodes of the second MOS transistor are connected to the second electrode of the first MOS transistor, the second signal line and the second scanning means, respectively.

10. A solid-state imaging device according to claim 9, wherein two storage means are connected to the first signal line in parallel, and the output charges stored in two storage means are transferred to the second signal line independently of each other with the aid of the transfer/switch means.

11. A solid-state imaging device comprising:
a plurality of photoelectric conversion elements arranged so as to form a two-dimensional matrix, for storing signal charges corresponding to incident light;
a first signal line for transferring the signal charges of photoelectric conversion elements in a predetermined column, in a column direction;
first switch means for transferring the signal charge stored in one of the photoelectric conversion elements to the first signal line, the first switch means including amplifier means for amplifying the signal charge stored in said one photoelectric conversion element into an amplified signal which is either a current signal or a voltage signal and for delivering the amplified signal to the first signal line, and selection/switch means for selecting a predetermined one of the photoelectric conversion elements in the predetermined column to supply the signal charge of the selected photoelectric conversion element to the input part of the amplifier means;

a second signal line for transferring the signal charge which is supplied from the first signal line, to an output terminal;

second switch means for transferring the signal charge on the first signal line to the second signal line, the second switch means being made up of a plurality of storage means for storing the output charge of the amplifier means at a time the electric charge in the input part of the amplifier means is reset by the reset means and for storing the output charge of the amplifier means at a time the signal charge of the photoelectric conversion element is applied to the amplifier means, and transfer/switch means for transferring the output charges which are stored in plural storage means, successively to the second signal line; and first and second scanning means for scanning each of the first and second switch means in a predetermined order.

12. A solid-state imaging device according to claim 11, wherein the selection/switch means is formed of a first MOS transistor, and the first, gate and second electrodes of the first MOS transistor are connected to the photoelectric conversion element, the first scanning means and the amplifier means, respectively, and wherein the amplifier means is formed of a bipolar transistor, and the first, second and third electrodes of the bipolar transistor are connected to the first scanning means, the second electrode of the first MOS transistor, and the first signal line, respectively 13. A solid-state imaging device according to claim 11, wherein each of plural storage means is formed of a series combination of a first MOS transistor and a capacitive element connected to the second electrode of the second MOS transistor, the first electrode of the second MOS transistor is connected to the first signal line, and the second MOS transistor is turned on or off in accordance with the potential of a gate line connected to the gate electrode of the second MOS transistor, and wherein the transfer/switch means is formed of a second MOS transistor, and the first, second and gate electrodes of the second MOS transistor are connected to the second electrode of the first MOS transistor, the second signal line and the second scanning means, respectively.

14. A solid-state imaging device according to claim 13, wherein two storage means are connected to the first signal line in parallel, and the output charges stored in two storage means are transferred to the second signal line independently of each other with the aid of the transfer/switch means.

15. A solid-state imaging device including a plurality of photoelectric conversion elements arranged so as to form a two-dimensional matrix for storing signal charges corresponding to incident light, amplifier means arranged in proximity to each of the photoelectric conversion elements for amplifying a signal charge which is stored in each photoelectric conversion element, and reset means for resetting the input of the amplifier means, wherein the output of the amplifier means at a time the input of the amplifier means is reset and the output of the amplifier means at a time the signal charge stored in the photoelectric conversion element is applied to the amplifier means, are separately stored in a pair of storage means, and the outputs of a plurality of pairs of storage means are successively scanned by scanning means.

16. A solid-state imaging device including a plurality of light receiving elements arranged so as to form a two-dimensional matrix, for converting incident light into an electric signal and for storing the electric signal, a plurality of amplifier means each disposed in proximity to a corresponding one of the light receiving elements for amplifying an electric signal which is stored in the light receiving element, output means for scanning the amplifier signals which are produced by plural amplifier means, to successively deliver the amplifier signals, and reset means for resetting a predetermined number of light receiving elements at the same time, wherein the output means includes a plurality of columns each having a plurality of storage capacitors, and wherein amplified output charges from the plurality of the amplifier means are simultaneously stored in the storage capacitors, and then the plural columns of the storage capacitors are scanned substantially simultaneously to parallelly read out the amplified output charges stored therein, to thereby deliver the amplified output charges successively.

17. A solid state imaging device comprising:

a plurality of photoelectric conversion elements arranged so as to form a two-dimensional matrix, for storing signal charges corresponding to incident light;

a plurality of first signal lines each for transferring amplified signals obtained by amplifying the signal charges stored in photoelectric conversion elements disposed in a predetermined column, in a column direction;

a plurality of first switch means each for transferring the signal charge stored in one of the photoelectric conversion elements to an associated first signal line, each first switch means including amplified means for amplifying the signal charge stored in the one photoelectric conversion elements into an amplified signal which is either a current signal or a voltage signal and for delivering the amplified signal to an associated first switch line, selection/switch means for selecting the one photoelectric conversion element to supply the signal charge of the selected photoelectric conversion element to the input part of the amplifier means, and reset means for resetting the electric charge in the input part of the amplifier means;

at least a second signal line for transferring the amplified signals supplied from the first signal lines to an output terminal;

a plurality of second switch means each for transferring the amplified signals on an associated first signal line to the second signal line, each second switch means including a plurality of storage means for storing the amplified signals of associated amplifier means as amplified signal charges both at a time the electric charge in the input part of associated amplifier means is reset by associated reset means and at a time the signal charge of associated photoelectric conversion element is applied to the associated amplifier means, and transfer/switch means for transferring the amplified signal charges stored in said plural storage means, successively to the second signal line; and first and second scanning means for scanning each of the first and second switch means in a predetermined order.

18. A solid-state imaging device according to claim 17, wherein the selection/switch means is formed of a first MOS transistor, the first gate electrodes of the first MOS transistor are connected to the photoelectric conversion element and the first scanning means, respectively, and the second electrode of the first MOS transistor is connected to the amplifier means and the reset means, wherein the amplifier means is formed of a second MOS transistor, and the first, gate and second electrodes of the second MOS transistor are connected to the first scanning means, the second electrode of the first MOS transistor, and the first signal line, respectively, and wherein the reset means is formed of a third MOS transistor, the first electrode of the third MOS transistor is connected to the second electrode of the first MOS transistor, and the gate and second electrodes of the third MOS transistor are connected to the first scanning means.

19. A solid-state imaging device according to claim 17, wherein each of plural storage means is formed of a series combination of a first MOS transistor and a capacitive element connected to the second electrode of the first MOS transistor, the first electrode of the first MOS transistor is connected to the first signal line, and the first MOS transistor is turned on or off in accordance with the potential of a gate line connected to the gate electrode of the first MOS transistor, and wherein the transfer/switch means is formed of a second MOS transistor, and the first, second, and gate electrodes of the second MOS transistor are connected to the second electrode of the first MOS transistor, the second signal line, and the second scanning means, respectively.

20. A solid-state imaging device according to claim 19, wherein two storage means are connected to each first signal line in parallel, and the amplified signal charges stored in two storage means are transferred to the second signal line independently of each other with the air of the transfer/switch means.

21. A solid-state imaging device according to claim 18, wherein the well of the second MOS transistor is connected to the second electrode of the second MOS transistor to keep the well and second electrode of the second MOS transistor at the same potential.

22. A solid-state imaging device according to claim 19, wherein a pair of second signal lines are used, four storage means are connected to the first signal line in parallel, amplified signal charges from two photoelectric conversion elements disposed in the predetermined column and in two predetermined adjacent rows of the matrix, are stored in four storage means in a horizontal blanking period, and the amplified signal charges stored in the four storage means are transferred to said pair of second signal lines independently of each other by means of the transfer/switch means, to perform a read operation for the pair of adjacent rows at once.

23. A solid-state imaging device comprising:
a plurality of photoelectric conversion elements arranged so as to form a two-dimensional matrix, for storing signal charges corresponding to incident light;
a plurality of first signal lines each transferring amplified signals obtained by amplifying the signal charges stored in photoelectric conversion elements disposed in a predetermined column, in a column direction;
a plurality of first switch means each for transferring the signal charge stored in one of the photoelectric conversion means including amplifier means for amplifying the signal charge stored in said one photoelectric conversion element into an amplified signal which is either a current signal or a voltage signal and for delivering the amplified signal charge to an associated first signal line, and reset means for resetting the electric charge in the input part of the amplifier means;
a second signal line for transferring the amplified signals supplied from the first signal lines, to an output terminal;
a plurality of second switch means each for transferring the amplified signals on an associated first signal line to the second signal line, each second switch means including a plurality of storage means for storing the amplified signals of each associated amplifier means as amplified signal charges both at a time the electric charge in the input part of the each associated amplifier means is reset by associated reset means and at a time the signal charge of associated photoelectric conversion element is applied to the each associated amplifier means, and transfer/switch means for transferring the amplified signal charges stored in said plural storage means, successively to the second signal line; and
first and second scanning means for scanning each of the first and second switch means in a predetermined order.

24. A solid-state imaging device according to claim 23, wherein each amplifier means is formed of a first MOS transistor, and the first, gate and second electrodes of the first MOS transistor are connected to the first scanning means, the photoelectric conversion element and the first signal line, respectively, and wherein the reset means is formed of a second MOS transistor, the first electrode of the second MOS transistor is connected to the gate electrode of the first MOS transistor, and the gate and second electrodes of the second MOS transistor are connected to the first scanning means.

25. A solid-state imaging device according to claim 23, wherein each of plural storage means is formed of a series combination of a first MOS transistor and a capacitive element connected to the second electrode of the first MOS transistor, the first electrode of the first MOS transistor is connected to the first signal line, and the first MOS transistor is turned on or off in accordance with the potential of a gate line connected to the gate electrode of the first MOS transistor, and wherein the transfer/switch means is formed of a second MOS transistor, and the first, second and gate electrodes of the second MOS transistor are connected to the second electrode of the first MOS transistor, the second signal line and the second scanning means, respectively.

26. A solid-state imaging device according to claim 25, wherein two storage means are connected to associated first signal lines in parallel, and amplified signal charges stored in the two storage means are transferred to the second signal line independently of each other with the aid of the transfer/switch means.

27. A solid-state imaging device comprising:

a plurality of photoelectric conversion elements arranged so as to form a two-dimensional matrix, for storing signal charges corresponding to incident light;

a plurality of first signal lines each for transferring amplified signals obtained by amplifying signal charges stored in photoelectric conversion elements disposed in a predetermined column, in a column direction;

a plurality of first switch means each for transferring the signal charge stored in one of the photoelectric conversion elements to an associated first signal line, each first switch means including amplifier means for amplifying the signal charge of the one photoelectric conversion element into an amplified signal which is either a current signal or a voltage signal and for delivering the amplified signal to an associated first signal line and resetting electric charge generated in the input part of the amplifier means, and selection/switch means for selecting the one photoelectric conversion element to supply the signal charge of the selected photoelectric conversion element to the input part of the amplifier means;

a second signal line for transferring the signal charges supplied from the first signal lines, to an output terminal;

a plurality of second switch means each for transferring the amplified signals on an associated first signal line to the second signal line, each second switch means including a plurality of storage means for storing the amplified signals of each associated amplifier means as amplified signal charge both at a time the electric charge in the input part of the each associated amplifier means is reset and at a time the signal charge of associated photoelectric conversion element is applied to the each associated amplifier means, and transfer/switch means for transferring the amplified signal charges stored in plural storage means, successively to the second signal line; and first and second scanning means for scanning each of the first and second switch means in a predetermined order.

28. A solid-state imaging device according to claim 27, wherein each selection/switch means is formed of a first MOS transistor, and the first, gate and second electrodes of the first MOS transistor are connected to an associated photoelectric conversion element, the first scanning means and associated amplifier means, respectively, and wherein each amplifier means is formed of a bipolar transistor, and the first, second and third electrodes of the bipolar transistor are connected to the first scanning means, the second electrode of the first MOS transistor, and an associated first signal line, respectively.

29. A solid-state imaging device according to claim 27, wherein each of the plural storage means is formed of a series combination of a first MOS transistor and a capacitive element connected to the second electrode of the second MOS transistor, the first electrode of the second MOS transistor is connected to an associated first signal line, and the second MOS transistor is turned on or off in accordance with the potential of a gate line connected to the gate electrode of the second MOS transistor, and wherein each transfer/switch means is formed of a second MOS transistor, and the first, second and gate electrodes of the second MOS transistor are connected to the second electrode of the first MOS transistor, the second signal line and the second scanning means, respectively.

30. A solid-state imaging device according to claim 29, wherein two storage means are connected to associated first signal lines in parallel, and amplified signal stored in the two storage means are transferred to the second signal line independently of each other with the aid of the transfer/switch means.

* * * * *